United States Patent [19]
McDowell

[11] Patent Number: 5,842,531
[45] Date of Patent: *Dec. 1, 1998

[54] ROTARY ROCK BIT WITH INFILTRATED BEARINGS

[75] Inventor: Kenneth O. McDowell, DeSoto, Tex.

[73] Assignee: Dresser Industries, Inc., Dallas, Tex.

[*] Notice: The term of this patent shall not extend beyond the expiration date of Pat. No. 5,794,726.

[21] Appl. No.: 839,782

[22] Filed: Apr. 16, 1997

Related U.S. Application Data

[63] Continuation-in-part of Ser. No. 637,169, Apr. 24, 1996.

[51] Int. Cl.$^6$ .................................................. E21B 10/22
[52] U.S. Cl. ............................ 175/372; 175/374; 384/95
[58] Field of Search ..................... 175/371, 372, 175/374; 384/95, 92

[56] References Cited

U.S. PATENT DOCUMENTS

| | | |
|---|---|---|
| 2,096,252 | 10/1937 | Koehring . |
| 2,365,562 | 12/1944 | Koehring . |
| 2,706,693 | 4/1955 | Haller . |
| 2,728,134 | 12/1955 | Haller . |
| 3,235,316 | 2/1966 | Whanger . |
| 3,492,120 | 1/1970 | Haller . |
| 3,890,018 | 6/1975 | Clamon . |
| 3,984,158 | 10/1976 | Sorensen et al. . |
| 3,992,763 | 11/1976 | Haynie et al. . |
| 4,012,238 | 3/1977 | Scales . |
| 4,026,657 | 5/1977 | Chmura . |
| 4,040,680 | 8/1977 | Keller . |
| 4,105,263 | 8/1978 | Sorensen et al. . |
| 4,121,927 | 10/1978 | Lohman et al. . |
| 4,207,658 | 6/1980 | Sorenson . |
| 4,232,912 | 11/1980 | Williamson . |
| 4,304,444 | 12/1981 | Persson . |
| 4,514,097 | 4/1985 | Daly . |
| 4,641,976 | 2/1987 | Kar . |
| 4,875,532 | 10/1989 | Langford, Jr. . |

FOREIGN PATENT DOCUMENTS

| | | |
|---|---|---|
| 758805 | 10/1956 | United Kingdom . |
| 1264482 | 2/1972 | United Kingdom . |

OTHER PUBLICATIONS

L.A. Zagorski et al., "The Effect of the Furnace Atmosphere on the Infiltration of Iron–Powder Compacts," *International Journal of Powder Metallurgy*, vol. 7, No. 2, pp. 41–53 (1971).

*Primary Examiner*—Frank Tsay
*Attorney, Agent, or Firm*—Gregory Garmong

[57] ABSTRACT

A rotary rock bit is formed as a rock bit body, a bearing shaft supported by the rock bit body, a rotary cutter adapted to be rotatably mounted on the bearing shaft, and at least one bearing that promotes rotation between the rotary cutter and the bearing shaft. Each bearing includes a bearing element having a steel matrix with steel-free volumes distributed therethrough. The matrix is a hypoeutectoid steel having more than about 0.40 weight percent carbon. An anti-galling alloy resides within the steel-free volumes of the steel matrix. The anti-galling alloy is a silver-copper alloy having a composition of from about 60 weight percent to about 95 weight percent silver, balance copper.

14 Claims, 3 Drawing Sheets

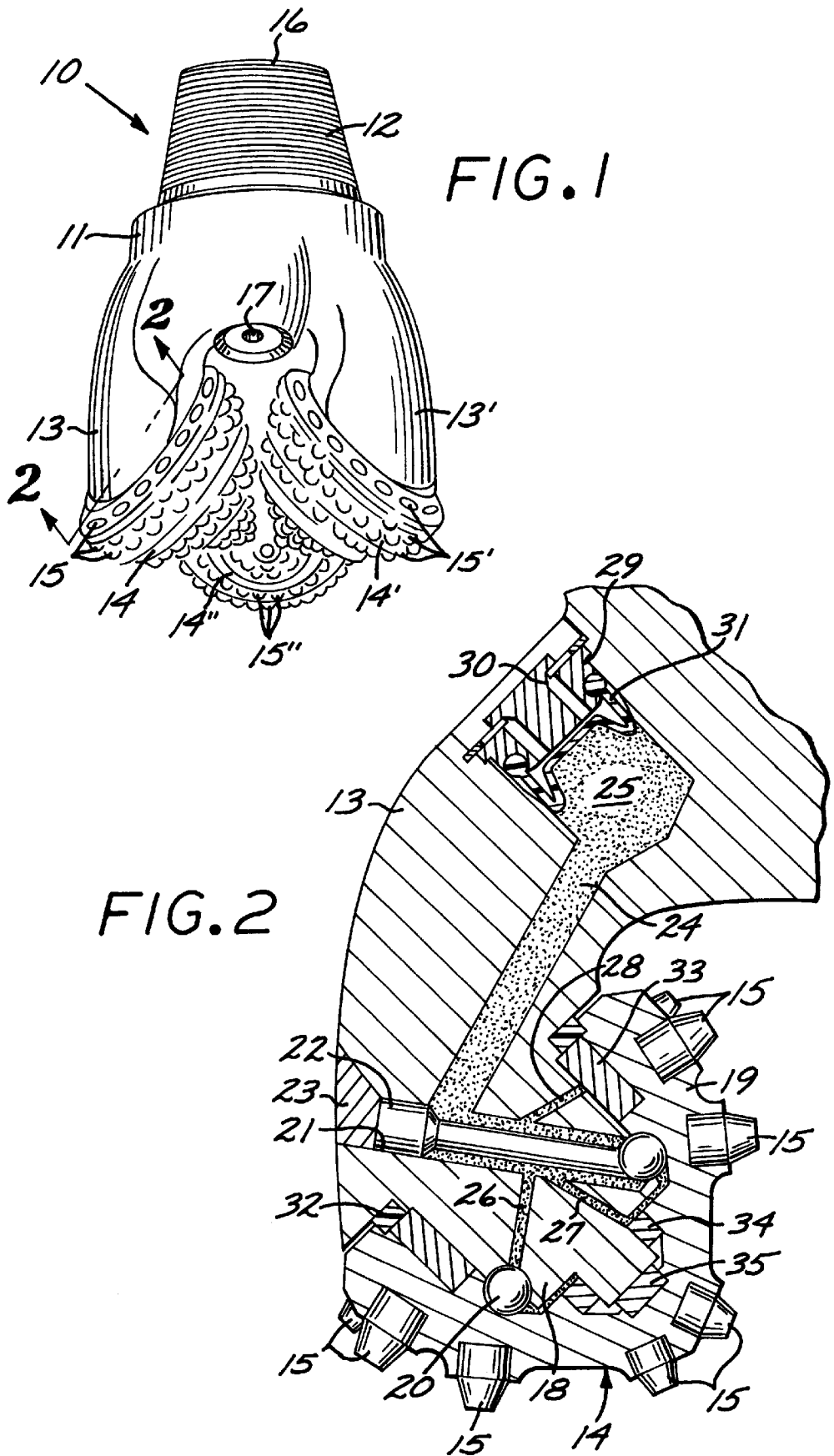

ROTARY ROCK BIT WITH INFILTRATED BEARINGS

This application is a continuation-in-part of pending application Ser. No. 08/637,169, filed Apr. 24, 1996, for which priority is claimed.

BACKGROUND OF THE INVENTION

This invention relates to apparatus for drilling in the earth, and, more particularly, to a rock bit and its bearing system.

Oil and gas production require the ability to drill deep holes into the earth using a rotary rock bit. The rotary rock bit typically includes a steel body, three bearing shafts extending from the body generally at three vertices of a tetrahedron, and a rotary cutter rotatably mounted on each bearing shaft. Journal and pilot bearings are provided to promote the rotation of each rotary cutter on its bearing shaft. The rock bit is attached to the lower end of a long string of drill pipe and lowered into a drill hole. The drill pipe string and thence the rock bit are forced against the bottom of the drill hole and rotated to effect further elongation of the drill hole. A lubricant is pumped through the drill pipe string to lubricate the mechanical elements and to flush rock cuttings from the cutting surface. The lubricant is selected to yield good performance in the cutting operation, but it may include corrosive constituents that attack the materials of the rock bit.

The rotary rock bit operates under extreme environmental conditions of a complex load state, corrosion, erosion, fluid pressures, and heat. The rotary rock bit must have good rock-cutting characteristics and a long operating lifetime, because raising the drill pipe string to replace the rock bit results in a substantial down-time in the drilling operation. There has been extensive work to improve the performance of the rotary cutter itself, with the result that the most vulnerable elements of the rock bit—the elements most likely to fail prematurely—are the bearings. Consequently, in the past 20–30 years, extensive research has been undertaken to develop improved bearings for use in the rock bit.

One approach to improved bearing performance is the infiltrated bearings described in U.S. Pat. No. 3,984,158. Steel powder is pressed and sintered to form a porous bearing matrix structure. An anti-galling alloy is infiltrated into the porosity of the matrix. The resulting bearing material is wear resistant due to the hardness of the matrix structure and also the lubricating effects of the anti-galling alloy in the interstices of the matrix.

Such bearings have proved highly effective and commercially successful in rock bit applications. However, there is always the desire to improve the performance to achieve a further increased operating lifetime with satisfactory performance. The present invention fulfills the need for an improved bearing material for use in rock bits and other applications involving excellent performance under adverse operating conditions.

SUMMARY OF THE INVENTION

The present invention provides a bearing and implements utilizing the bearing, most particularly a rotary rock bit in which the bearing is disposed between the stationary body of the rock bit and the rotary cutters. The bearing exhibits improved hardness and drilling performance, while having good resistance to corrosion and erosion in rock-bit applications. Undesirable microstructural features of the bearing microstructure, most particularly retained austenite, are largely avoided as a result of the careful selection of the constituents and processing of the bearing material.

In accordance with the invention, a rotary rock bit comprises a rock bit body, a bearing shaft supported by the rock bit body, a rotary cutter adapted to be rotatably mounted on the bearing shaft, and at least one bearing that promotes rotation between the rotary cutter and the bearing shaft. Each bearing includes a bearing element having a steel matrix with steel-free volumes distributed therethrough and an anti-galling alloy residing within the steel-free volumes of the steel matrix. The steel matrix has a hypoeutectoid composition with more than about 0.40 weight percent carbon. The anti-galling alloy comprises a silver-copper alloy consisting essentially of from about 60 percent to about 95 (preferably from about 85 to about 95) weight percent silver, balance copper and incidental minor amounts of other elements. (Ideally, there would be no incidental other elements, but small amounts that do not interfere with the properties and processing of the anti-galling infiltrant alloy, or which increase its fluidity during infiltration processing, are acceptable.)

The invention also extends to the preparation of the rotary rock bit. In accordance with this aspect of the invention, a method for fabricating a rock bit initially includes preparing a rock bit bearing by providing a mixture of powders having a net composition that is a hypoeutectoid steel having more than about 0.40 percent by weight carbon and sintering the mixture of powders to produce a porous matrix structure having open-cell porosity therein. The method further includes providing an infiltrant alloy having a composition consisting essentially of from about 60 percent to about 95 (preferably from about 85 to about 95) weight percent silver, balance copper and incidental minor amounts of other elements, and heating the porous matrix structure in contact with the infiltrant alloy so that the infiltrant alloy melts and infiltrates into the steel-free volumes of the open-cell porosity to produce an infiltrated structure, but such that the steel matrix structure does not melt. The resulting bearing precursor may be machined at this point to approximately its final configuration.

The infiltrated structure is thereafter heat treated to produce a tempered martensitic matrix structure and a hardened infiltrant. A preferred heat treatment includes heating the infiltrated structure to a temperature of from about 1375° F. to about 1425° F. (for one preferred embodiment) or from about 1375° F. to about 1475° F. (for another preferred embodiment) to austenitize the matrix structure, and thereafter quenching the infiltrated structure. The quenched infiltrated structure is thereafter heat treated at a temperature of from about 350° F. to about 550° F., thereby simultaneously tempering the matrix structure and hardening the infiltrant alloy. The sintering of the steel matrix alloy and subsequent heat treating produces a shape that is near to that of the final bearing, but some final machining, including surface grinding or polishing, is usually required. The infiltrated and heat treated structure is therefore final machined as necessary into the bearing configuration, and the bearing is assembled into the rock bit structure.

The bearing has a high-carbon steel matrix with the silver-copper infiltrant distributed therethrough in the steel-free volumes. The matrix is a tempered martensite with substantially no retained austenite therein. The avoidance of the soft retained austenite, whose presence would reduce the wear resistance of the bearing, results from the selection, in combination, of the composition of the matrix, the composition of the infiltrant, and the heat treatment. The avoidance of retained austenite in the steel matrix is an important advantage of the invention. The infiltrant has a strengthened structure that provides wear resistance and also lubricity.

The approach of the invention produces a bearing and an article that utilizes the bearing, which have improved performance due to the elimination of soft phases in the bearing structure. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a perspective view of a three-cone rotary rock bit;

FIG. 2 is a sectional view of the rock bit of FIG. 1, taken generally along line 2—2;

DETAILED DESCRIPTION OF THE INVENTION

Figure 3:
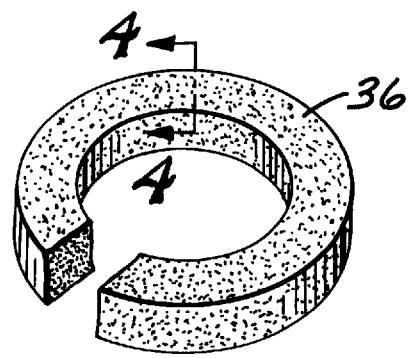
FIG. 3 is a perspective view of a bearing used in the rock bit of FIG. 1.

FIG. 1 shows a three cone jet-type rotary rock bit 10, as a preferred form of the rock bit made according to the present invention. The illustrated rock bit 10 is described in detail by way of example, and the invention is not limited to use with this particular type and configuration of rock bit. The rock bit 10 includes a bit body 11 having an upper threaded portion 12. The threaded portion 12 allows the bit 10 to be connected to the lower end of a rotary drill string (not shown). Extending from the bit body 11, generally at three vertices of a tetrahedron, are three substantially identical arms with two of the arms 13 and 13' visible in FIG. 1. Three rotary cone cutters 14, 14', and 14" are rotatably positioned on three respective bearing pins, in the form of journals and bearings to be discussed subsequently, extending from the arms. Each of the cutters 14, 14', and 14" includes a respective cutting structure 15, 15', and 15" on its outer surface adapted to disintegrate rock formations as the bit 10 is rotated and moved through the formations. The cutting structures 15, 15', and 15" are shown in the form of tungsten carbide inserts. Other cutting structures, such as steel teeth, may be used as the cutting structure on the cone cutters.

The rock bit 10 includes a central passageway 16 extending along the central axis of the body 11 to allow drilling fluid to enter from the lower end of the rotary drill string (not shown) immediately above and pass downward through three jet nozzles, one nozzle 17 being visible in FIG. 1, to the bottom of the well bore. In use, the rock bit 10 is connected as the lowest member of the rotary drill string (not shown) and lowered into a well bore until the cone cutters 14, 14', and 14" engage the bottom of the well bore. Upon engagement with the bottom of the well bore, the drill string is rotated, rotating bit 10 therewith. The cone cutters 14, 14', and 14" rotate on their respective bearing pins. Drilling fluid is forced downwardly through the interior passage of the rotary drill string and the drilling fluid continues through the central passageway 16 of the rock bit 10, passing through the nozzles 17 to the bottom of the well bore. The flow of drilling fluid flows upwardly in the annulus between the rotary drill string and the wall of the well bore to the earth's surface, carrying the rock chips with it. The drilling fluid thus lubricates the rock bit and also carries away the chips produced in the drilling operation.

A sectional view of one of the arms 13 of the rock bit 10 incorporating a bearing system in accordance with the invention is shown in FIG. 2. The elongated lower portion of arm 13 forms a journal 18, and a shell 19 of the rotatable cutter 14 is mounted upon the journal 18. Positioned on the exterior surface of the rotatable cutter 14 are the cutting structures 15. The cutting structures 15 are preferably in the form of a series of tungsten carbide inserts. As the bit is rotated, the inserts contact and disintegrate the rock formations to create the earth bore hole.

The bearing system constructed according to the invention ensures free rotation of the rotatable cutter 14 under the severe drilling conditions. A series of ball bearings 20 ensure that the shell 19 of the cutter 14 is rotatably locked upon the journal 18. The rotatable cutter 14 is positioned upon journal 18 and the series of ball bearings 20 is inserted through a bore 21 extending into the arm 13. After the ball bearings 20 are in place, a plug 22 is inserted in the bore 21 and welded therein by a weld 23.

The journal 18 and the arm 13 are also provided with a passage 24 to channel lubricant from a lubricant reservoir 25 to the areas between the various bearing surfaces. The passage 24 intersects the bore 21, and the plug 22 is of reduced diameter in this area to form an annulus that allows the lubricant to be channeled to the bearings. Additional passages 26, 27, and 28 allow the lubricant to be channeled from the bore 21 to the bearings. The lubricant reservoir 25 is filled with a lubricant containing entrained particles of an anti-galling material. A cap 29 is locked in place on the arm 13 to retain the lubricant in the reservoir 25. The cap 29 is constructed so that a passage 30 communicates between the interior of the reservoir 25 and the outside of the bit. This passage 30 allows pressure equilibration and prevents pressure differentials from damaging the bearing system. A flexible diaphragm 31 serves to hold the lubricant in position and at the same time provides compensation for pressure changes.

The lubricant fills the reservoir 25, the passage 24, the bore 21, the additional passages 26, 27, and 28, and the spaces between the cutter shell 19 and the journal 18. A flexible seal 32 contacts the cutter shell 19 and forms a seal between the cutter shell 19 and the journal 18 to prevent a loss of lubricant or contamination of the lubricant from materials in the well bore. The pressure on the lubricant is equalized by the cap 29 and the diaphragm 31, and the lubricant is not lost or contaminated during the drilling operation. As the bit is lowered into the well bore, it is subjected to increasing fluid pressure the deeper it goes. If means were not provided for equalizing the pressure on the lubricant, the pressure differential across the seal would cause it to rupture.

Positioned in the inner surface of the shell 19 of the cone cutter 14 is a journal bearing 33 and a pilot bearing 34, both having a bushing shape. The pilot bearing 34 is typically of a continuous or split bushing shape, optionally with a thrust pilot, and the journal bearing 33 may be of a continuous or split bushing shape. Optionally, a thrust button 35 is positioned in the nose of the shell 19. The bushings 33 and 34 and the thrust button 35 are locked into the cutter shell 19 by force fitting, or other techniques such as split or floating arrangements may be used, as appropriate. The bearing surface areas of the bushings 33 and 34 have alternating areas of hard, wear-resistant matrix and areas of anti-galling material, to be discussed in more detail subsequently. By this approach, the useful lifetime of the bearings is extended, thereby extending the useful lifetime of the rotary rock bit.

Figure 4:
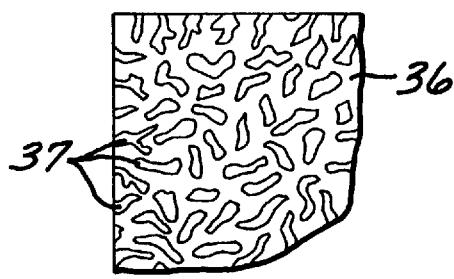
FIG. 4 is a drawing of the microstructure of the bearing of FIG. 3, taken along line 4—4.
Figure 5:
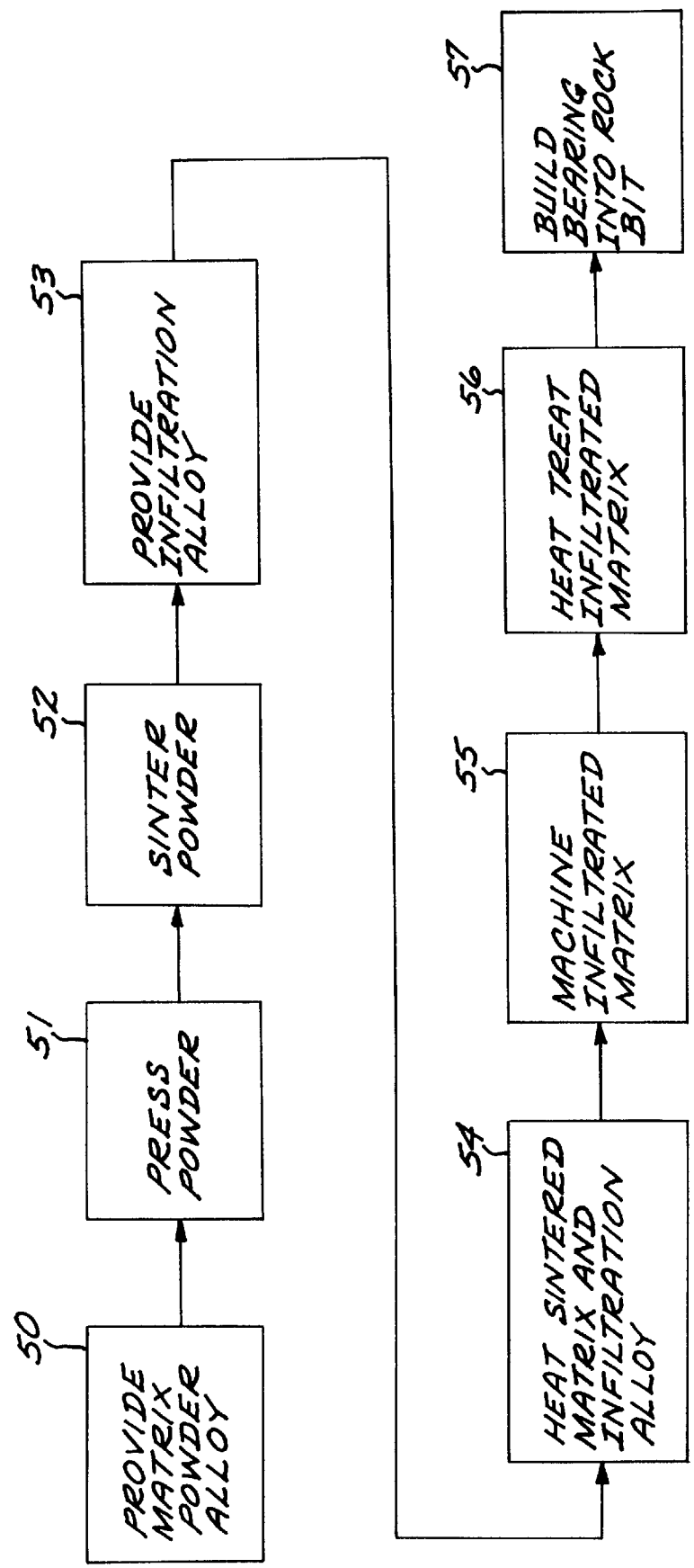
FIG. 5 is a block flow diagram of a method for preparing the rotary rock bit.

FIG. 5 depicts a preferred method for preparing the rock bit 10, and FIGS. 3–4 illustrate the structure at intermediate processing steps. In this approach, a porous bearing matrix is first prepared and thereafter infiltrated with an anti-galling alloy. This infiltrated structure is heat treated and machined to the desired bearing shape and size. This approach may be used to prepare either or both of the bearings 33 and 34. The bearing is then assembled with the other components to form the rotary rock bit 10.

Referring to FIG. 5, an alloy for the matrix is provided in the form of a steel powder, numeral 50. The finished matrix is a hypoeutectoid steel having a carbon content of more than about 0.40 weight percent carbon. The term "hypoeutectoid" means that the steel has a carbon content of less than that corresponding to the steel eutectoid composition, which typically occurs at about 0.77–0.80 weight percent carbon, depending upon the amount and type of other alloying elements present in the steel. Thus, the steel matrix typically has a composition of from about 0.40 to about 0.77 weight percent carbon, other alloying elements such as, for example, nickel or molybdenum, and the balance iron plus incidental impurities.

As will be discussed subsequently, within this broad range of carbon content there are narrower preferred carbon ranges and contents. It is often difficult to purchase commercially steel powders having specific carbon contents. It is therefore preferred to start with a steel powder of very low or substantially zero carbon content, and controllably add carbon to a desired carbon level. In this approach, the preferred starting alloy powder chosen for the matrix is a low-carbon nickel steel alloy powder consisting of AISI 4600 powder particles of a size of about −270 mesh, whose carbon content is controllably increased to a desired carbon level. AISI 4600 alloy has a composition in weight percent of about 1.8 percent nickel, 0.5 weight percent molybdenum, balance iron and incidental impurities.

In the preferred processing, graphite or carbon particles are mixed with the low-carbon alloy powder prior to pressing to obtain the desired net composition carbon content. As used herein, a "net composition" is the overall percentage by weight of the elements in a mixture of particles of different compositions, such as a mixture of AISI 4600 powder and carbon particles.

Pre-alloyed steel powders having the desired carbon content can also be used, if they are available.

A die lubricant is preferably added to the metallic alloy powder prior to pressing to lubricate the die and increase the green strength of the as-pressed matrix. A preferred die lubricant is zinc stearate in an amount of about 1 percent by weight of the powder mixture. The die lubricant burns off during subsequent sintering.

The mixture of alloy powder, carbon, and lubricant is pressed, numeral 51, using a force of about 35–40 tons per square inch of cross-sectional area, to form a "green" powder compact. The mixture is pressed in a die that approximates the final shape of the selected bearing element, but is somewhat oversize (typically by 5–20 percent) to allow for shrinkage during sintering and for final machining. The greater the pressing pressure, the higher the apparent density of the part after sintering, with the highest pressing pressures producing an apparent density which approaches the theoretical maximum density. The preferred pressing pressure produces an apparent density of about 6.8 grams per cubic centimeter (about 85–87 percent of theoretical density) after sintering. Other densities, particularly those within the range of about 50–90 percent of theoretical density, are contemplated by the invention.

The green powder compact is sintered, numeral 52, preferably at a temperature of about 2050° F. for a time of about 40 minutes, and preferably in a hydrogen atmosphere, but alternatively in a vacuum. Lower sintering temperatures and associated longer sintering times may instead be employed, as long as the sintering temperature permits interdiffusion and homogenization of the carbon into the steel powder. During this sintering treatment, the carbon mixed with the steel alloy powder diffuses into the steel alloy powder to produce a homogeneous structure with the desired carbon content. Diffusion of the carbon throughout the structure as well as diffusion bonding of the particles together requires a sintering temperature above about 1800° F. The diffusion process requires several hours at 1800° F., while requiring less than 1 hour at temperatures above 2000° F.

Referring to FIGS. 3 and 4, a porous matrix 36, formed by the process just described and used in the journal bearing 33, is shown. (The precursor of the journal bearing 33 is illustrated in FIG. 3 as an example of the bearings and structures according to the invention, but the invention is applicable to the bearings 34 and 35 as well.) An enlarged view of a section of the porous matrix 36 after sintering is shown in FIG. 4. The porous matrix 36 contains a multiplicity of interconnected pores 37. In the preferred case about 14 to about 16 percent by volume of the assintered structure is porosity, and about 86 to 84 percent by volume is the sintered steel matrix material. (The porosity has no steel within it and becomes the "steel-free volumes" filled with infiltrant after subsequent infiltration processing.) About 95 percent of the pores 37 left in the matrix 36 are interconnected, such porosity being termed "open-cell porosity". These interconnected pores can be filled with an anti-galling material by infiltration.

The infiltrant alloy is provided, numeral 53. The porous matrix is infiltrated with a molten infiltrant alloy of from about 60 to about 95 weight percent silver, balance copper, plus minor amounts of incidental impurities and elements added to increase the fluidity of the alloy during infiltration. The preferred composition range is from about 85 to about 95 weight percent silver. Previously, the inventor believed that the minimum silver content was about 85 weight percent. Further studies by the inventor have shown that the silver may extend to as low as about 60 weight percent.

If the infiltrant alloy contains less than about 85 weight percent silver, infiltration may be accomplished in most circumstances, although the final properties of the infiltrant will be different from those of the higher-silver embodiments. The cost of the reduced-silver alloys in the range of from about 60 to about 85 percent may justify their use in many situations. The silver content may not be less than about 60 weight percent, because with increasing copper-richness the infiltrant alloy becomes incompatible with typical soap-based, calcium-complex, mineral oil-containing lubricants having significant amounts of molybdenum disulfide, which are used in some rock bits. Additionally, progressively lower silver contents below about 60 weight percent result in a progressively higher liquidus temperature for the silver-copper alloy, requiring higher infiltration temperatures that necessitate the use of high-temperature furnaces and, in some cases, expensive high-temperature vacuum furnaces. If the infiltrant alloy contains more than about 95 weight percent silver, it cannot be hardened to a sufficient strength level during subsequent heat treating.

Within this range of from about 60 to about 95 weight percent silver, there are three presently preferred embodiments. In one, the infiltrant has a composition of from about 89 to about 91 weight percent silver, balance copper and incidental impurities. In the second, the infiltrant has a composition of from about 91 to about 93 weight percent silver, balance copper and incidental impurities. Most preferably in the case of the second preferred embodiment, the infiltrant has a composition of about 92.5 weight percent silver, balance copper and incidental impurities. The third preferred embodiment has about 72 weight percent silver, 28 weight percent copper, near the eutectic composition of the silver-copper system.

The infiltrant may optionally have an alloy constituent that promotes fluidity of the liquid alloy during liquid-phase infiltration. The term "consisting essentially of" as used herein is to be construed as permitting the presence, in a small amount, of such an optional constituent that promotes fluidity. For example, about 0.2–0.5 percent lithium has been added to the alloy with successful results.

The composition of the infiltrant alloy is selected in cooperation with the selection of the composition of the steel matrix alloy, to achieve particular objectives in the final bearing material and product. These compositions must be selected cooperatively so that post-infiltration heat treatments, to which both the matrix and the infiltrant are simultaneously subjected, achieve optimized structures in the matrix and infiltrant. If the infiltrant alloy is selected to have less than about 91 weight percent silver, preferably in the range of about 89 to about 91 weight percent silver, its composition is below that of the limit of solid solubility of copper in silver (usually indicated on equilibrium phase diagrams as about 91.2 weight percent silver, or about 8.8 weight percent copper) at the copper-silver eutectic temperature of about 1435° F. Consequently, the subsequent austenitizing heat treatment temperature of the steel is limited to a maximum of about 1435° F., with a minimum of about 1375° F. as dictated by the iron-carbon phase diagram. Because of the control limitations of commercial heat treatment furnaces, the actual maximum specified austenitizing temperature is usually selected as about 1425° F. to ensure that the temperature will not exceed the 1435° F. maximum value. If a higher austenitizing temperature were used such that the temperature of the infiltrant exceeded the copper-silver eutectic temperature, the infiltrant would be subject to incipient melting, leading to a degradation of the microstructure.

In practical terms, this restriction limits the carbon content of the steel to the range of from about 0.68 weight percent carbon to the steel eutectoid composition, which is typically about 0.77 weight percent carbon. The steel matrix with this carbon content is relatively hard and strong, but of relatively low ductility. One important advantage of this high carbon content is that the steel matrix need not be case hardened as by carburizing or nitriding for most bearing applications. Such a surface hardening operation can lead to a surface that is rough and otherwise undesirable.

On the other hand, if the infiltrant alloy is selected to have more than about 91 weight percent silver, preferably in the range of about 91 to about 93 weight percent silver, its composition is above that of the limit of solid solubility of copper in silver at the copper-silver eutectic temperature of about 1435° F. Consequently, the subsequent austenitizing heat treatment temperature of the steel may be increased above the copper-silver eutectic temperature of 1435° F. by an amount that is determined by the Ag (solid solution)+ Liquid solidus line of the copper-silver equilibrium phase diagram, which is readily available to those skilled in the art. This solidus line cannot be exceeded during the austenitizing heat treatment. For the preferred case of an infiltrant having about 92.5 weight percent silver, the maximum austenitizing heat treatment temperature is about 1475° F., with the same minimum value of about 1375° F. This increasing of the maximum austenitizing heat treatment temperature allows lower carbon steels to be used, with a preferred carbon content of the steel in the range of from about 0.40 weight percent carbon to about 0.50 weight percent carbon. The steel matrix with this carbon content is relatively weaker, but of relatively high ductility. The selection of an infiltrant having more than about 91 weight percent silver also permits the steel matrix materials having higher carbon contents up to that of the eutectoid temperature to be used as well, so that the overall range for the carbon content of the steel is from about 0.40 weight percent carbon to about 0.77 weight percent carbon. When the higher carbon contents are used, the steel is harder and less ductile, as discussed previously.

Thus, the first two preferred embodiments of the invention (i.e., about 89–91 weight percent silver and about 91–93 weight percent silver) permit the fabrication of bearings that are harder and less ductile (higher carbon contents in the steel matrix) or softer and more ductile (lower carbon contents in the steel matrix), while still achieving excellent lubrication performance, substantial absence of retained austenite in the steel matrix, and good hardness in the infiltrant phase of the final bearing. The third preferred embodiment of the invention (i.e., about 72 weight percent silver) is used when a lower-temperature infiltration is desired, at the cost of lower properties of the final infiltrant.

The approach of joint optimization of the silver-copper infiltrant and the steel matrix therefore allows the designer of the rock bit and the bearing to have a wide degree of latitude in specifying the final properties of the rock bit and the bearing, an important advantage. The present invention is not concerned with the procedure by which the particular material properties required in the rock bit and the bearing are selected by the rock bit designer, as these are within the scope of the rock bit design art responsive to particular rock bit requirements such as the nature of the rock to be penetrated. Instead, the present invention is concerned with the approach to providing bearings with such properties as may be requested by the designer of the rock bit and the bearings. The addition of other alloying elements in the steel matrix of the bearing, such as those that are present in the preferred AISI 4600 base alloy, further improves the ability to provide requested properties such as corrosion resistance.

Significantly, the bearing structures and rock bits of the invention are provided without the use of an alloying element in the infiltrant that may degrade the properties of the steel matrix. In one prior practice, see col. 5 lines 10 et seq. of U.S. Pat. No. 4,105,263, the infiltrant alloy was a silver-manganese alloy. While operable and highly successful for many applications, the use of the silver-manganese alloy has the drawback that the manganese can diffuse into the steel matrix during infiltration and stabilize austenite retention during subsequent heat treating to produce a tempered martensite structure. The retained austenite is softer than the desired tempered martensite, resulting in a bearing that has a less-than-desired hardness and wear resistance. The use of the silver-copper infiltrant alloy rather than the silver-manganese alloy infiltrant, in the indicated composition ranges, avoids this problem.

The infiltration step is preferably accomplished at a temperature of about 2050° F. for a time sufficient to infiltrate the silver-copper alloy into the open-cell porosity of the steel matrix, numeral 54. The silver-copper alloy is placed on the porous matrix 36 and the heat is applied to allow capillary action and gravity to draw the silver-copper alloy into and fill the pores 37 (i.e., the steel-free volumes of the matrix). Lower temperatures may be used for infiltrants having from about 60 to about 85 weight percent silver, balance copper.

After infiltration, the infiltrated matrix is preferably rough machined to the desired bearing shape and size, numeral 55.

The infiltrated matrix is thereafter heat treated to optimize the properties of the matrix and the infiltrant, numeral 56. The infiltrated matrix is heated to a temperature in the range of from about 1375° F. to the maximum austenitizing temperature of the steel as discussed previously and maintained at that temperature for about 30 minutes. This heating step austenitizes the steel alloy and solutionizes the copper in the silver-rich phase of the silver-copper infiltrant. The infiltrated matrix is thereafter oil quenched to ambient temperature, which has the effect of converting the steel alloy to a martensitic microstructure and causing a supersaturation of the copper in the silver-rich phase of the silver-copper infiltrant. The infiltrated matrix is thereafter heated to a temperature of from about 350° F. to about 550° F. for two hours and air cooled to ambient temperature. The heating to this range tempers the martensite of the steel alloy and ages the silver-rich phase of the silver-copper infiltrant to a desired hardness.

The resulting metallurgical structure has a tempered martensite matrix with substantially no retained austenite. A precipitation-hardened silver-copper matrix fills the steel-free volume of the matrix. The compositions of the matrix and the infiltrant alloy are cooperatively selected to achieve this result, as discussed previously. That is, the final microstructure in FIG. 4 the matrix 36 is tempered martensite and the anti-galling alloy that fills what were the pores 37.

Lastly, the bearing produced in the manner discussed above is final machined, surface ground or polished, as necessary, and assembled with the other described elements of the rock bit 10, numeral 57. In this operation, the bearings are affixed to the rock bit base.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rotary rock bit, comprising:
   a rock bit body;
   a bearing shaft supported by the rock bit body;
   a rotary cutter adapted to be rotatably mounted on the bearing shaft; and
   at least one bearing that promotes rotation between the rotary cutter and the bearing shaft, each bearing including a bearing element having
       a steel matrix with steel-free volumes distributed therethrough, the steel matrix having a hypoeutectoid composition with more than about 0.40 weight percent carbon, and
       an anti-galling alloy residing within the steel-free volumes of the steel matrix, the anti-galling alloy comprising a silver-copper alloy consisting essentially of from about 60 weight percent to about 95 weight percent silver, balance copper.

2. The rotary rock bit of claim 1, wherein each bearing element comprises from about 14 to about 16 percent by volume of the anti-galling alloy.

3. The rotary rock bit of claim 1, wherein the anti-galling alloy includes from about 60 weight percent to about 85 weight percent silver.

4. The rotary rock bit of claim 1, wherein the anti-galling alloy further includes lithium in an amount of from about 0.2 to about 0.5 percent by weight.

5. The rotary rock bit of claim 1, wherein the steel matrix has a tempered martensitic microstructure and the anti-galling alloy has a precipitation-hardened microstructure.

6. The rotary rock bit of claim 5, wherein the steel matrix has substantially no retained austenite.

7. The rotary rock bit of claim 1, wherein the at least one bearing comprises a journal bearing.

8. The rotary rock bit of claim 1, wherein the at least one bearing comprises a pilot bearing.

9. A method for fabricating a rock bit, comprising the steps of:
   preparing a rock bit bearing, the step of preparing a rock bit bearing comprising the steps of
       providing a mixture of powders having a net composition that is a hypoeutectoid steel having more than about 0.40 percent by weight carbon,
       sintering the mixture of powders to produce a porous matrix structure having open-cell porosity therein,
       providing an infiltrant alloy having a composition consisting essentially of from about 60 percent to about 95 percent silver, balance copper, and
       heating the porous matrix structure in contact with the infiltrant alloy so that the infiltrant alloy melts and infiltrates into the open-cell porosity to produce an infiltrated structure, but such that the matrix structure does not melt.

10. The method of claim 9, including an additional step, after the step of heating the porous matrix structure, of
   heat treating the infiltrated structure to produce a tempered martensitic matrix structure and a hardened infiltrant alloy.

11. The method of claim 9, including an additional step, after the step of heating the porous matrix structure, of
   heat treating the infiltrated structure by austenitizing the matrix structure, thereafter
   quenching the austenitized matrix structure produced in the step of austenitizing, and thereafter
   tempering the quenched structure produced in the step of quenching, thereby simultaneously hardening the infiltrant alloy.

12. The method of claim 11, wherein the step of tempering includes the step of
   heating the quenched infiltrated structure to a temperature of from about 350° F. to about 550° F.

13. The method of claim 9, including an additional step, after the step of preparing a rock bit bearing, of
   machining the infiltrated structure to about the shape required for the rock bit bearing.

14. The method of claim 9, including an additional step, after the step of preparing a rock bit bearing, of
   affixing the rock bit bearing to a rotary rock bit base, wherein the rotary rock bit base comprises a body, a bearing shaft supported by the body, and a rotary cutter adapted to be rotatably mounted on the bearing shaft, the rock bit bearing being positioned to promote rotation between the rotary cutter and the bearing shaft.

* * * * *